(12) United States Patent
Leigh (10) Patent No.: US 12,228,281 B2
(45) Date of Patent: Feb. 18, 2025

(54) CONTROL STRATEGY FOR HOT SURFACE IGNITER

(71) Applicant: CHONGQING LE-MARK TECHNOLOGY CO., LTD., Chongqing (CN)

(72) Inventor: Peter Leigh, Chongqing (CN)

(73) Assignee: CHONGQING LE-MARK TECHNOLOGY CO., LTD., Chongqing (CN)

( * ) Notice: Subject to any disclaimer, the term of this patent is extended or adjusted under 35 U.S.C. 154(b) by 442 days.

(21) Appl. No.: 17/761,164

(22) PCT Filed: Sep. 11, 2020

(86) PCT No.: PCT/CN2020/114726
§ 371 (c)(1),
(2) Date: Mar. 16, 2022

(87) PCT Pub. No.: WO2021/073326
PCT Pub. Date: Apr. 22, 2021

(65) Prior Publication Data
US 2023/0349554 A1    Nov. 2, 2023

(30) Foreign Application Priority Data
Oct. 15, 2019  (CN) .......................... 201910977529.1

(51) Int. Cl.
*F23Q 7/22*    (2006.01)
*F24C 3/10*    (2006.01)
(Continued)

(52) U.S. Cl.
CPC ........... *F23Q 7/22* (2013.01); *G05D 23/1951* (2013.01); *F24C 3/10* (2013.01); *G05B 15/02* (2013.01); *H05B 3/14* (2013.01)

(58) Field of Classification Search
None
See application file for complete search history.

(56) References Cited

U.S. PATENT DOCUMENTS 4,615,282 A * 10/1986 Brown .................... F23N 5/123
                                                  431/66
4,858,576 A *  8/1989 Jeffries ................. F02P 19/027
                                                  123/145 A
(Continued)

FOREIGN PATENT DOCUMENTS

CN           1640195 B  *  7/2010    ............... H05B 1/02
CN         102403928        4/2012
(Continued)

OTHER PUBLICATIONS

Scholl et al., "Development and Analysis of a Controlled Hot Surface Ignition System for Lean Burn Gas Engines", May 2012, Proceedings of the ASME 2012 Internal Combustion Engine Division Spring Technical Conference ICES2012. (Year: 2012).*
(Continued)

*Primary Examiner* — Mohammad Ali
*Assistant Examiner* — Kelvin Booker
(74) *Attorney, Agent, or Firm* — FisherBroyles, LLP; Jason P. Mueller (57) ABSTRACT

Disclosed is a control strategy for a hot surface igniter. On the basis of a hardware circuit of the hot surface igniter and a software algorithm, a working time of the hot surface igniter is divided into t1, t2, . . . , and tn time periods. In each time period, an output voltage or an output power of the hardware circuit is adjusted by the software algorithm to make the hot surface igniter reach an expected temperature. Through the control strategy of the disclosure, ignition time
(Continued)

of the hot surface igniter may be easily controlled. The requirements of a user of igniting in a short time are satisfied.

8 Claims, 4 Drawing Sheets

(51) Int. Cl.
    *G05B 15/02*     (2006.01)
    *G05D 23/19*     (2006.01)
    *H05B 3/14*     (2006.01)

(56) References Cited

U.S. PATENT DOCUMENTS

| | | | | |
|---|---|---|---|---|
| 5,567,144 | A * | 10/1996 | McCoy | F23N 5/203 431/66 |
| 5,865,612 | A * | 2/1999 | Hill | F23N 5/203 431/258 |
| 5,951,276 | A * | 9/1999 | Jaeschke | F23Q 7/12 431/66 |
| 6,474,979 | B1 * | 11/2002 | Rippelmeyer | G05F 1/44 431/258 |
| 6,777,653 | B2 * | 8/2004 | Burkhart | F24C 3/103 219/263 |
| 8,634,179 | B2 * | 1/2014 | Rubinshtein | F23Q 7/26 361/264 |
| 8,992,211 | B2 * | 3/2015 | Kociecki | F23Q 7/24 431/66 |
| 9,500,386 | B1 * | 11/2016 | Walsh | G05D 23/1951 |
| 10,281,938 | B2 * | 5/2019 | Mowris | F24F 11/77 |
| 2004/0060924 | A1 * | 4/2004 | Burkhart | F24C 3/103 219/263 |
| 2009/0317755 | A1 * | 12/2009 | Kociecki | F23Q 7/24 431/66 |
| 2010/0108658 | A1 * | 5/2010 | Chodacki | F23Q 7/24 219/268 |
| 2011/0086319 | A1 * | 4/2011 | Chodacki | F23Q 7/10 431/74 |
| 2012/0094240 | A1 * | 4/2012 | Rubinshtein | F23N 5/242 431/28 |
| 2012/0221150 | A1 * | 8/2012 | Arensmeier | G05B 23/0221 702/183 |
| 2014/0186779 | A1 * | 7/2014 | Chodacki | F23Q 7/26 431/6 |
| 2014/0266755 | A1 * | 9/2014 | Arensmeier | F24F 11/49 340/679 |
| 2016/0348901 | A1 * | 12/2016 | Karkow | F23D 11/44 |
| 2017/0268797 | A1 * | 9/2017 | Mowris | F24H 9/2064 |
| 2019/0301742 | A1 * | 10/2019 | Sprowl | H05B 3/42 |

FOREIGN PATENT DOCUMENTS

| | | |
|---|---|---|
| CN | 204346194 | 5/2015 |
| CN | 207922283 | 9/2018 |
| CN | 208735665 | 4/2019 |
| CN | 110594783 | 12/2019 |
| GB | 2401930 | 11/2004 |
| WO | WO-2004083728 A1 * | 9/2004      F23N 5/242 |

OTHER PUBLICATIONS

Charrier et al., "Electric Actuation For Flight & Engine Control System: Evolution, Current Trends & Future Challenges", Jan. 2007, 45th AIAA Aerospace Sciences Meeting and Exhibit. (Year: 2007).*

* cited by examiner

CONTROL STRATEGY FOR HOT SURFACE IGNITER

CROSS-REFERENCE

This application is a national stage entry application under 35 U.S.C. 371 of PCT Patent Application No. PCT/CN2020/114726, filed Sep. 11, 2020, which claims priority to Chinese Patent Application No. 201910977529.1 filed Oct. 15, 2019, the entire contents of each of which are incorporated herein by reference.

TECHNICAL FIELD

The disclosure relates to a control strategy, and in particular to a temperature change control strategy for a hot surface igniter in a working process.

BACKGROUND

Combustion devices in regions/countries such as China usually adopt electric spark ignition. However, the electric spark ignition has problems such as unreliable ignition, deflagration, and electromagnetic interference. The unreliable ignition is because the electric spark ignition is easily affected by factors such as temperature, humidity, ignition gap, arc leakage, and pollution. Therefore, North American countries with many types of the combustion devices and more advanced combustion device application technologies adopt a hot surface ignition technology. On the basis of the hot surface ignition technology, after a hot surface igniter reaches a high temperature in advance, combustible gas/fuel enters a combustion area, and problems that may occur by electric spark is completely avoided.

The hot surface igniter is factory-set with a rated voltage and a rated temperature itself. The present hot surface igniter is controlled by using a constant voltage, so that it takes a certain time until the hot surface igniter reaches a final temperature, such as 5 s, 10 s or even longer time. Then, while a user wants the hot surface igniter to reach a required temperature faster (usually within the rated temperature), a voltage of a hardware circuit of the hot surface igniter may be increased, as to enable it to be heated faster. However, such an approach may shorten a service life of the hot surface igniter, and this approach needs to replace a power supply, so the cost is increased. In addition, while the voltage used by the user exceeds the rated voltage of the hot surface igniter, not only the service life of the hot surface igniter may be shortened rapidly, but also it is more likely that the hot surface igniter is damaged immediately at the moment of ignition.

SUMMARY

An object of the disclosure is to provide a control strategy for a hot surface igniter, specifically an ignition time control strategy for a hot surface igniter. By means of the ignition time control strategy of the disclosure, ignition time of the hot surface igniter may be controlled, as to solve problems that a service life of the hot surface igniter is shortened or even damaged and a power supply cost is increased when the user wants to ignite in a short time. Ignition requirements of the hot surface igniter in different application scenarios are satisfied.

In order to achieve the above object, the disclosure suggests: a control strategy for a hot surface igniter, wherein, on the basis of a hardware circuit and a software algorithm of the hot surface igniter, working time of the hot surface igniter is divided into t1, t2, . . . , and tn time periods, and in each time period, an output voltage or an output power of the hardware circuit is adjusted by the software algorithm to make the hot surface igniter reach an expected temperature.

A control strategy for a hot surface igniter, including the following steps:
step I, obtaining a working time-temperature change curve that meets requirements according to product characteristics and application scenarios of the hot surface igniter;
step II, dividing the working time of the hot surface igniter in step I into t1, t2, . . . , and tn time periods; and
step III, in each time period, controlling, by the software algorithm, the output voltage or output power of the hardware circuit to make the hot surface igniter reach a temperature value in the time period.

Wherein, in step III, in each time period, the output voltage may be controlled to make the igniter reach the temperature value in each time period.

Wherein, in step III, in each time period, the output power may be controlled to make the igniter reach the temperature value in each time period.

Wherein, in step III, in any time period, the output voltage or output power may be controlled to make the igniter reach the temperature value in this time period.

Further, in step III, a constant voltage may be inputted to control the temperature value of the hot surface igniter in the t1, t2 and/or tn time period, and may include any combination of the following processes:
S1: performing system initialization of the software algorithm;
S2: inputting initial Pulse Width Modulation (PWM);
S3: adjusting PWM output to perform voltage control;
S4: sampling the output voltage of the hardware circuit of the hot surface igniter;
S5: determining whether a sampled voltage Ur is equal to an expected voltage U0: if so, entering
S6, and if not, entering S7;
S6: determining whether a PWM control signal of a Microcontroller Unit (MCU) is sent: if so, returning to S3, and if not, ending; and
S7: performing proportional integral derivative controller (PID) calculation to obtain a control variable, and returning to S3.

Further, in step III, a constant power may be outputted to control the temperature value of the hot surface igniter in the t1, t2 and/or tn time period, including the any combination of the following processes:
S1: performing system initialization;
S2: inputting initial PWM;
S3: adjusting PWM output to perform voltage control;
S4: sampling the output voltage of the hardware circuit of the hot surface igniter;
S5: sampling a resistance value or a current of the hot surface igniter;
S6: calculating power according to a formula $P=U^2/R$ or $P=UI$;
S7: determining whether a voltage Pr in S6 is equal to an expected voltage P0: if so, entering S8, and if not, entering S9;
S8: determining whether a PWM control signal of an MCU is sent: if so, returning to S3, and if not, ending; and
S9: performing PID calculation to obtain a control variable, and returning to S3.

In an arrangement, after sampling a resistance value or a current of the hot surface igniter in S5, preform the resistance value determination or the current determination in S10, if the resistance value or the current is normal, enter S6, and if the resistance value or the current is anomalous, end.

In an arrangement, the working time of the hot surface igniter is divided into t1, t2, . . . , and tn time periods according to a slope of the working time-temperature change curve, and time intervals corresponding to segments with consistent or similar continuous slopes of the working time-temperature change curve are set as one time period.

The present disclosure includes a number of beneficial effects. For instance, the disclosure provides a control strategy for a hot surface igniter. Through the control strategy of the disclosure, the ignition time of the hot surface igniter may be easily controlled. The requirements of the user of igniting in a short time are satisfied.

In addition, the control strategy for the hot surface igniter of the disclosure is performed within the rated voltage of the hot surface igniter, and will not affect the service life of the hot surface igniter at all. In addition, there is no need to replace the power supply of the hot surface igniter, so that the application cost of the hot surface igniter is controlled and it is more acceptable for the customers.

An application range of the hot surface igniter is improved, so that the same hot surface igniter may be used in application scenarios with different temperatures and time requirements, such as a stove, a water heater, and an engine, etc. In addition, this type of the hot surface igniter is independently researched and developed by the company, and until now, no company in the world has used or disclosed it.

DETAILED DESCRIPTION OF THE EMBODIMENTS

The disclosure is described below through embodiments shown in the drawings, but the disclosure is not limited to the described implementation modes, any improvements or replacements in the basic spirit of this embodiment still belong to a scope of protection claimed by the claims:

As shown in FIGS. 1-6, an embodiment of the disclosure provides a control strategy for an ignition temperature of a hot surface igniter in working time, and it is divided into constant voltage control, constant power control, variable voltage control, variable power control, and variable voltage and variable power mixed control.

For application scenarios in which a temperature is required to be linearly changed in working time, the working temperature of the hot surface igniter may be controlled in a constant power mode or a constant voltage mode during the whole working time.

For application scenarios in which a temperature is non-linearly changed in working time, the working temperature of the hot surface igniter may be controlled in a variable voltage control mode, a variable power control mode or a variable voltage and variable power mixed control mode, including the following steps:

step I, obtaining a working time-temperature change curve that meets requirements according to product characteristics and application scenarios of the hot surface igniter;

step II, dividing the working time of the hot surface igniter in step I into t1, t2, . . . , and tn time periods; and step III, in each time period, controlling, by the software algorithm, the output voltage or output power of the hardware circuit to make the hot surface igniter reach a temperature value in the time period.

The working time-temperature change curve may be set according to related factors such as product characteristics of the hot surface igniter itself, input power, application scenarios, and customer demands, and may also be obtained by repeated experimental verification and related calculations according to these related factors. A size of a time scale of t1, t2, . . . , and tn may be obtained through the experimental verification and related calculations.

If the variable voltage control is used in step III, then the working time of the hot surface igniter is divided into t1, t2, . . . , and tn time periods, so that the temperature in any one time period may be controlled by the same voltage, but the temperatures in different time periods may be controlled by the different voltages. Based on the temperature curve of each working time period of the hot surface igniter, an expected voltage U0 in this time period is obtained, and a hardware circuit is controlled by a software algorithm so that a voltage in this time period is Ur=U0, and the hot surface igniter reaches the expected temperature. In another working time period, the hardware circuit is controlled by the software algorithm to make the voltage in this time period equal to the expected voltage in this time period, so that the hot surface igniter reaches the expected temperature in this time period.

Figure 1:
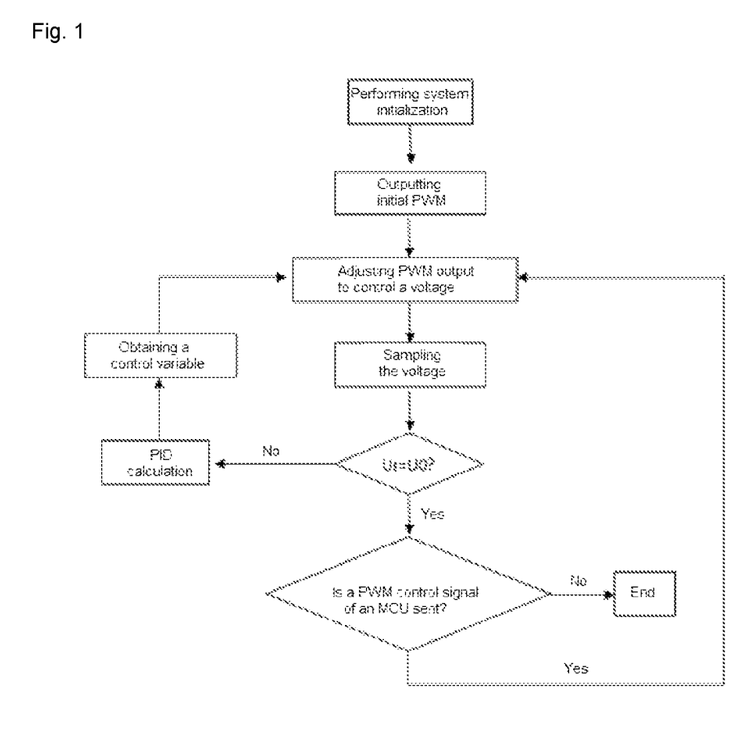
FIG. 1 is a voltage control flow diagram in any time period.

As shown in FIG. 1, a voltage control process in any one time period may be as follows:

S1: performing system initialization of the software algorithm;

S2: inputting initial Pulse Width Modulation (PWM);

S3: adjusting PWM output to perform voltage control;

S4: sampling the output voltage of the hardware circuit of the hot surface igniter;

S5: determining whether a sampled voltage Ur is equal to an expected voltage U0: if so, entering S6, and if not, entering S7;

S6: determining whether a PWM control signal of a Microcontroller Unit (MCU) is sent: if so, returning to S3, and if not, ending; and S7: performing proportional integral derivative controller (PID) calculation to obtain a control variable, and returning to S3.

If the variable power control is used in step III, then the working time of the hot surface igniter is divided into t1, t2, . . . , and tn time periods, so that the temperature in any one time period may be controlled by the same power, but the temperatures in different time periods may be controlled by different powers. According to the temperature curve of each working time period of the hot surface igniter, an expected power P0 in this time period is obtained, and the hardware circuit is controlled by the software algorithm so that a power in this time period is Pr=P0, and the hot surface igniter reaches an expected temperature. In another working time period, the hardware circuit is controlled by the software algorithm to make the power in this time period equal to the expected power in this time period, so that the hot surface igniter reaches the expected temperature in this time period.

Figure 2:
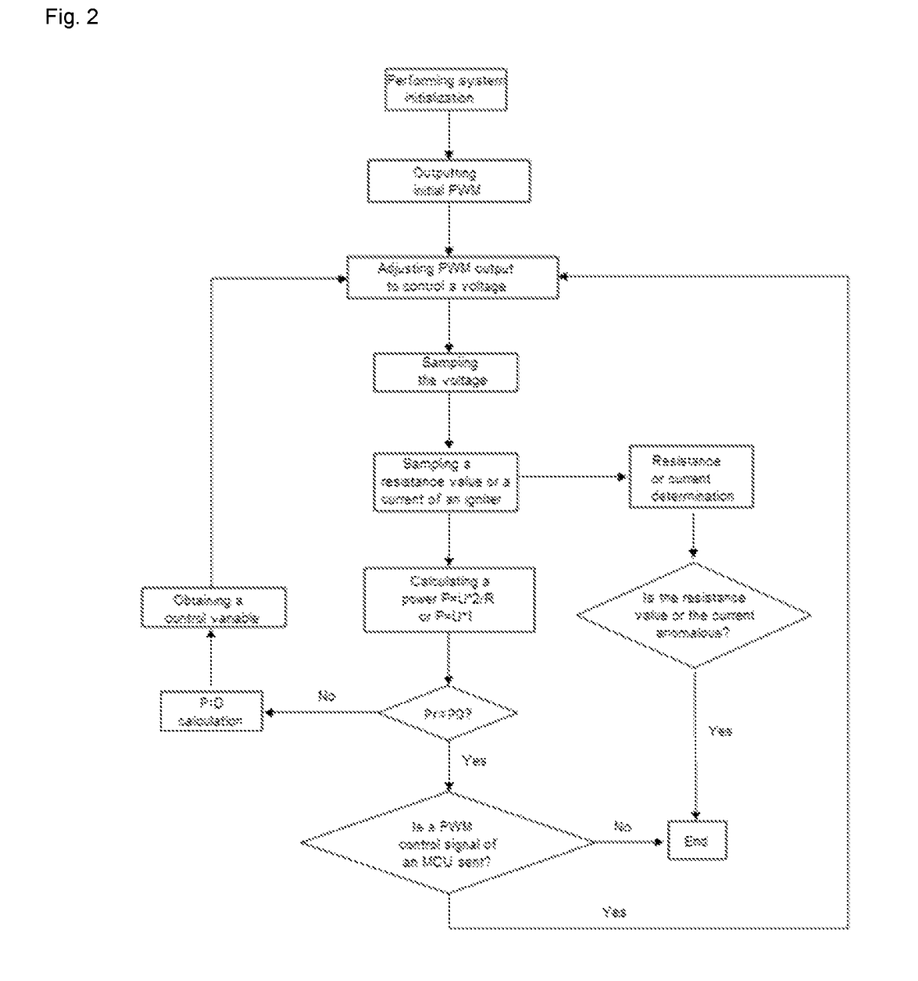
FIG. 2 is a power control flow diagram in any time period.

As shown in FIG. 2, a power control process in any one time period may be as follows:

S1: performing system initialization;
S2: inputting initial PWM;
S3: adjusting PWM output to perform voltage control;
S4: sampling the output voltage of the hardware circuit of the hot surface igniter;
S5: sampling a resistance value or a current of the hot surface igniter;
S6: calculating power according to a formula $P=U^2/R$ or $P=UI$;
S7: determining whether a voltage Pr in S6 is equal to an expected voltage P0: if so, entering S8, and if not, entering S9;
S8: determining whether a PWM control signal of an MCU is sent: if so, returning to S3, and if not, ending; and
S9: performing PID calculation to obtain a control variable, and returning to S3.

As another implementation mode of this embodiment, after sampling a resistance value or a current of the hot surface igniter in S5, perform the resistance value determination or perform the current determination in S10, if the resistance value or the current is normal, enter S6, and if the resistance value or the current is anomalous, end.

If the variable voltage and variable power mixed control is used in step III, then the working time of the hot surface igniter is divided into t1, t2, . . . , and tn time periods, and different time periods are selected to use the voltage control or power control, respectively. Herein a selection standard is based on efficiency, i.e. to choose the control mode that will reach the expected temperature in a shorter time. In each corresponding working time period, the voltage control or power control is used respectively, and a control flow is as above.

As one of selection modes, the working time period may be divided according to a slope of the working time-temperature change curve. For example, if the slope of a time interval is continuously consistent or does not change rapid, the time interval is set as a working time period tn.

An example of applying the control strategy in this embodiment to an actual using process of the hot surface igniter is provided below. The application examples in following two fields are only used to illustrate an implementation process of the disclosure, and the implementation process of the disclosure is not limited to be only applied in these two fields.

Example 1: Application in Domestic or Commercial Gas Stove and Water Heater

While the gas stove or the water heater is used, long time from ignition to ignition success may arouse an anxious mood of people, and the time is generally best to be controlled within 5 seconds.

However, in application scenarios in which there is no time requirement, in order to guarantee non-over-temperature and service life of the hot surface igniter, a control mode of constant voltage or constant power is generally used to slowly heat up the igniter.

In combination with the above, if the hot surface igniter is needed to be well used in the gas cooker or the water heater, two contradictory aspects must be balanced. Therefore, the three types of the control strategies including the variable voltage control, the variable power control, and the variable voltage and variable power mixed control in this embodiment may be used to guarantee the service life of the hot surface igniter and shorten the ignition time of the gas cooker and the water heater.

Figure 3:
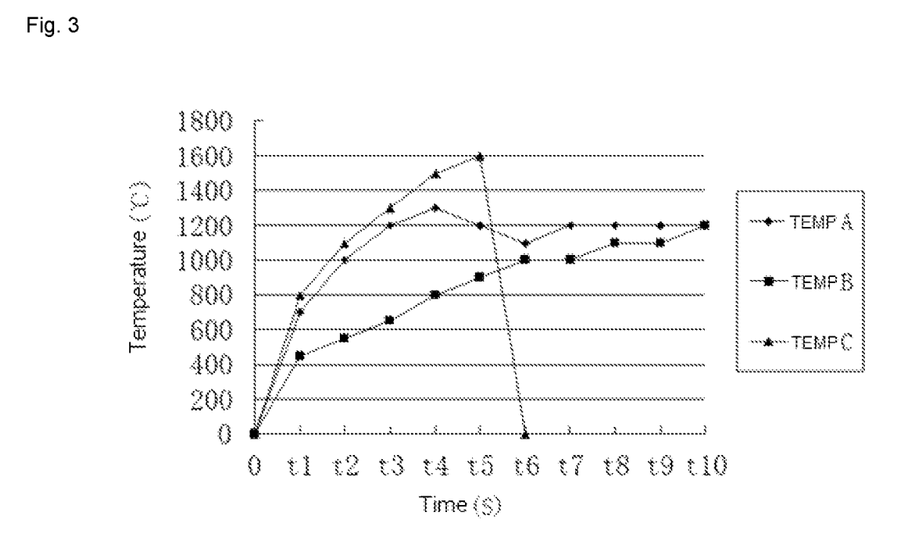
FIG. 3 is a working time-temperature change curve of a hot surface igniter of domestic or commercial gas cooker and water heater in Embodiment I.

FIG. 3 is a working time-temperature change curve of domestic or commercial gas cooker and water heater. It uses a dedicated temperature measurement laboratory, uses a high-precision temperature measurement instrument, and monitors a working curve of the igniter in real time through a computer. Technical parameters are adjusted for purposes of the different application requirements, to obtain a best time scale.

Taking the working curve of the heating hot surface igniter in FIG. 3 as an example, if the control strategy of this embodiment is adopted, the hot surface igniter may present a temperature A curve, and may reach the highest temperature between t3 and t4 to ignite a combustible gas. If common voltage or power control is used, the hot surface igniter may show a temperature B curve, the combustible gas may be ignited at the time point of t10, or it may also show a temperature C curve, it is damaged at the time point of t5 to t6 due to over-temperature.

Applying the ignition strategy of this embodiment guarantees not only the achievement of the ignition in a short time, but also the using safety and service life of the hot surface igniter.

For an application on an engine preheating system, a requirement for time is not high, but a requirement for power or temperature is high. To this end, the constant voltage or constant power control may be used according to the actual application.

Figure 4:
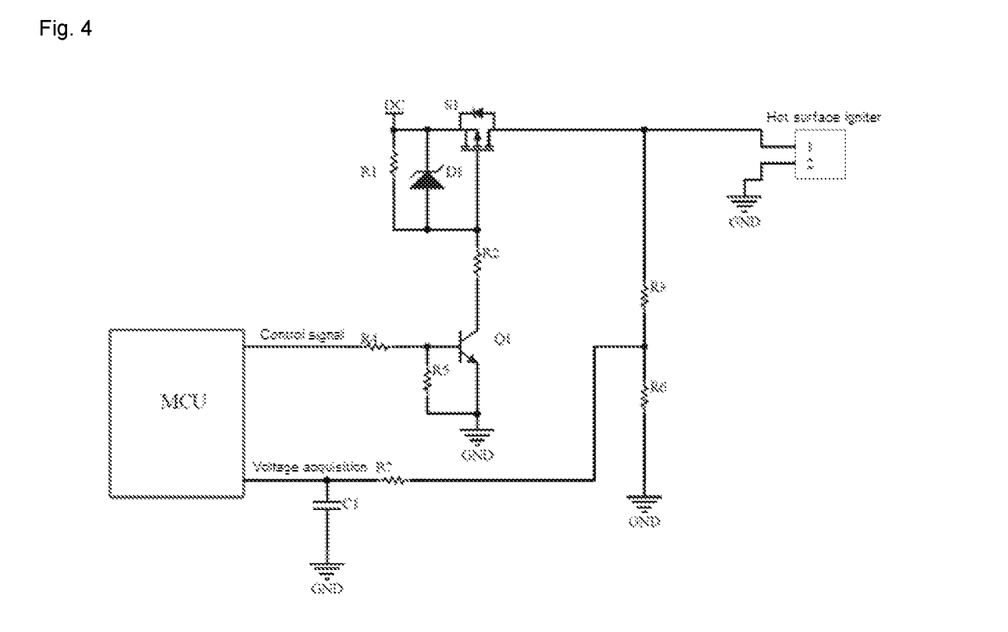
FIG. 4 to FIG. 6 are hardware circuit diagrams.
Figure 5:
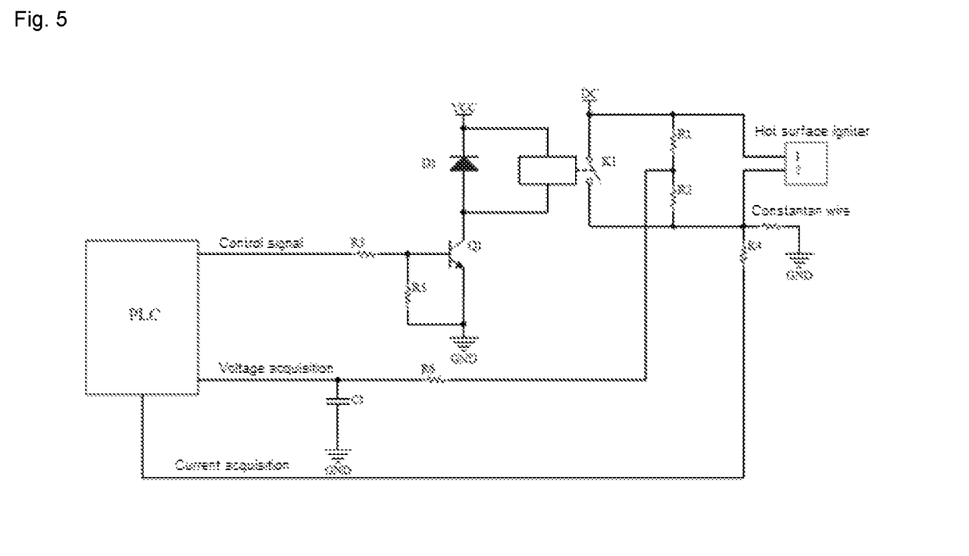
Figure 6:
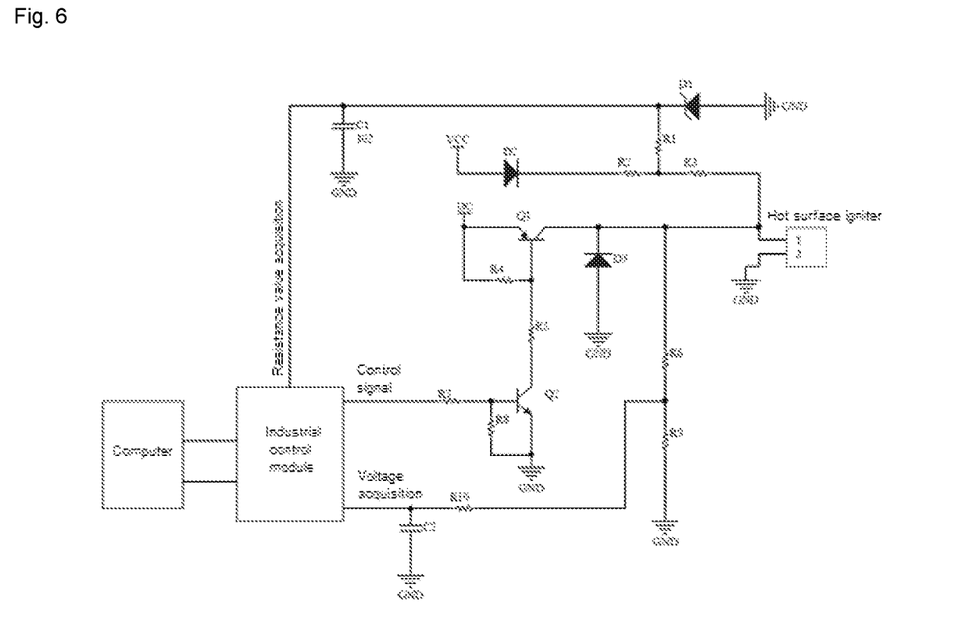

In addition, in FIGS. 4-6, circuit diagrams of hardware control of the hot surface igniter of this embodiment is also provided. Certainly, these circuit diagrams are only for better explaining the disclosure, and should not be understood as limitation to the disclosure.

Herein a circuit diagram including a Microcontroller Unit (MCU) is shown in FIG. 4. The MCU has two routes of output, one route is control signal output, and the other route is voltage acquisition output.

A control signal output terminal is connected to a base of a triode Q1 after being connected with a resistor R4, an emitter of the triode is grounded, a collector is connected to a resistor R2, and a resistor R5 is connected between the base of the triode Q1 and a transmitter. The other end of the resistor R2 is connected with a grid of a field effect tube S1, a source of the field effect tube S1 is connected with a power supply DC, a drain of the field effect tube is connected with a positive electrode of the hot surface igniter, and the negative electrode of the hot surface igniter is grounded. A voltage stabilizing diode D1 is also connected between the grid and the source of the field effect tube S1. A positive electrode of the voltage stabilizing diode D1 is connected with the source of the field effect tube S1, and a negative electrode is connected with the grid of the field effect tube S1, and a resistor R1 is also connected between the grid and the source of the field effect triode S1. A voltage acquisition output terminal is connected to a resistor R3 after being connected with a resistor R7, and the resistor R3 is connected to the negative electrode of the hot surface igniter. In addition, a branch connection resistor R6 is installed between R7 and R3, the R6 is grounded, and a branch connection capacitor C1 is installed between the MCU and R7, and the C1 is grounded. The voltage acquisition and signal control of the hot surface igniter may be achieved through the hardware circuit in FIG. 4. The variable voltage or constant voltage control may be achieved.

FIG. 5 shows another circuit diagram, including a Programmable Logic Controller (PLC). The PLC has three routes of output, one route is control signal output, one route is voltage acquisition output, and the other route is current acquisition output.

A control signal output terminal is connected to a base of a triode Q1 after being connected with a resistor R3, an emitter of the triode is grounded, and a resistor R5 is connected between the base of the triode Q1 and a transmitter. A collector of the triode is connected to a negative electrode of a diode D1, a positive electrode of the D1 is connected to a power supply VCC, an electromagnetic switch K1 is connected between the positive electrode and the negative electrode of the diode D1, one end of the electromagnetic switch K1 is connected to a positive electrode of the hot surface igniter, and the other end is connected to a negative electrode of the hot surface igniter, and the negative electrode of the hot surface igniter is also grounded through a constantan wire. A voltage acquisition output terminal is connected to a resistor R1 after being connected with a resistor R6, the resistor R1 is connected to the positive electrode of the hot surface igniter, a branch connection resistor R2 is installed between the resistors R6 and R1, and the resistor R2 is connected with the negative electrode of the hot surface igniter. A branch connection capacitor C1 is installed between the PLC and R6, and the C1 is grounded. A current acquisition output terminal is connected to the negative electrode of the hot surface igniter after being connected with a resistor R4. The signal control, voltage acquisition and current acquisition of the hot surface igniter may be achieved through the hardware circuit in FIG. 5. The acquisition of power may be achieved through the acquisition of the voltage and current. Further, the constant voltage control, constant power control, variable voltage control, variable power control or variable voltage and variable power mixed control of the hot surface igniter is achieved.

FIG. 6 shows another circuit diagram, including a computer connected with an industrial control module, and the industrial control module has three routes of output, one route is control signal output, one route is voltage acquisition output, and the last route is resistance acquisition output.

A control signal output terminal is connected to a base of a triode Q2 after being connected with a resistor R7, an emitter of the triode is grounded, a collector is connected to a resistor R5, and a resistor R8 is connected between the base of the triode Q2 and a transmitter. The other end of the resistor R5 is connected with a base of a triode Q1, an emitter of the triode Q1 is connected with a power supply DC, a collector is connected with a positive electrode of the hot surface igniter, and the negative electrode of the hot surface igniter is grounded. A resistor R4 is also connected between the emitter and the base of the triode Q1, and the collector of the triode Q1 is also grounded through a diode D3. A voltage acquisition output terminal is connected to a resistor R6 after being connected with a resistor R10, and the resistor R6 is connected to a positive electrode of the hot surface igniter. In addition, a branch connection resistor R9 is installed between R10 and R6, the resistor R9 is grounded, and a branch connection capacitor C2 is installed between the industrial control module and R10, and the C2 is grounded. A resistance value acquisition output terminal is connected to the positive electrode of the hot surface igniter after being sequentially connected with the resistors R1 and R3. A branch connection capacitor C1 is installed between the industrial control module and the resistor R1, and grounded. Another branch connection diode D1 is installed between the industrial control module and the resistor R1, and grounded. A branch connector resistor R2 and a diode D2 are installed between the resistors R1 and R3, and connected with a power supply VCC. The signal control, voltage acquisition and resistance value acquisition of the hot surface igniter may be achieved through the hardware circuit in FIG. 6. The acquisition of power may be achieved through the acquisition of the voltage and resistance. Furthermore, the constant voltage control, constant power control, variable voltage control, variable power control, or variable voltage and variable power mixed control of the hot surface igniter is achieved.

The invention claimed is:

1. A control strategy for a hot surface igniter: comprising:
   dividing a working time of the hot surface igniter into t1, t2, ..., and tn time periods on the basis of a hardware circuit of the hot surface igniter and a software algorithm, and
   adjusting an output voltage or an output power of the hardware circuit by the software algorithm to make the hot surface igniter reach an expected temperature, wherein adjusting comprises:
      step I, obtaining a working time-temperature change curve that meets requirements according to product characteristics and application scenarios of the hot surface igniter;
      step II, dividing the working time of the hot surface igniter in step I into t1, t2, ..., and tn time periods;
      step III, in each time period, controlling, by the software algorithm, the output voltage or output power of the hardware circuit to make the hot surface igniter reach a temperature value in the time period.

2. The control strategy for a hot surface igniter according to claim 1, wherein the working time of the hot surface igniter is divided into t1, t2, ..., and tn time periods according to a slope of the working time-temperature change curve, and time intervals corresponding to segments with continuous, consistent or similar slopes of the working time-temperature change curve are set as one time period.

3. The control strategy for a hot surface igniter according to claim 1, wherein in step III, in each time period, the output voltage is controlled to make the igniter reach a temperature value in each time period.

4. The control strategy for a hot surface igniter according to claim 1, wherein in step III, in each time period, the output power is controlled to make the igniter reach a temperature value in each time period.

5. The control strategy for a hot surface igniter according to claim 1, wherein in step III, in any time period, the output voltage or output power is controlled to make the igniter reach a temperature value in this time period.

6. The control strategy for a hot surface igniter according to claim 1, wherein in step III, a constant voltage is inputted to control the temperature value of the hot surface igniter in the t1, t2 and/or tn time period, comprising the following processes:
   S1: performing system initialization of the software algorithm;
   S2: inputting initial pulse width modulation (PWM);
   S3: adjusting PWM output to perform voltage control;
   S4: sampling the output voltage of the hardware circuit of the hot surface igniter;

S5: determining whether a sampled voltage Ur is equal to an expected voltage U0: if so, entering S6, and if not, entering S7;

S6: determining whether a PWM control signal of a microcontroller unit (MCU) is sent: if so, returning to S3, and if not, ending; and S7: performing proportional integral derivative controller (PID) calculation to obtain a control variable, and returning to S3.

7. The control strategy for a hot surface igniter according to claim 1, wherein in step III, a constant power is outputted to control the temperature value of the hot surface igniter in the t1, t2 and/or tn time period, comprising the following processes:

S1: performing system initialization;

S2: inputting initial pulse width modulation (PWM);

S3: adjusting PWM output to perform voltage control;

S4: sampling the output voltage of the hardware circuit of the hot surface igniter;

S5: sampling a resistance value or a current of the hot surface igniter;

S6: calculating power according to a formula $P=U^2/R$ or $P=UI$;

S7: determining whether a voltage Pr in S6 is equal to an expected voltage P0: if so, entering S8, and if not, entering S9;

S8: determining whether a PWM control signal of a microcontroller unit (MCU) is sent: if so, returning to S3, and if not, ending; and S9: performing proportional integral derivative controller (PID) calculation to obtain a control variable, and returning to S3.

8. The control strategy for a hot surface igniter according to claim 7, wherein after sampling a resistance value or a current of the hot surface igniter in S5, preform the resistance value determination or the current determination in a subsequent process:

S10: if the resistance value or the current is normal, enter S6, and if the resistance value or the current is anomalous, end.

* * * * *